US005913912A

United States Patent [19]

Nishimura et al.

[11] Patent Number: 5,913,912

[45] Date of Patent: Jun. 22, 1999

[54] FLIGHT STRIPS MANAGEMENT METHOD AND SYSTEM

[75] Inventors: Takeshi Nishimura; Takahiko Kobayashi, both of Kanagawa, Japan

[73] Assignee: Fujitsu Limited, Kawasaki, Japan

[21] Appl. No.: 08/654,862

[22] Filed: May 28, 1996

[30] Foreign Application Priority Data

Nov. 17, 1995 [JP] Japan .................................... 7-300062

[51] Int. Cl.[6] .............................. G06F 7/00; G06F 19/00

[52] U.S. Cl. ................................ 701/35; 701/14; 701/15; 701/16; 701/120

[58] Field of Search ................................ 701/14, 15, 16, 701/24, 33, 35, 116, 120; 705/5–6; 371/68.1; 395/182.09; 364/130, 131, 133, 134

[56] References Cited

U.S. PATENT DOCUMENTS

| | | | |
|---|---|---|---|
| 4,750,127 | 6/1988 | Leslie et al. | 364/428 |
| 4,811,230 | 3/1989 | Graham et al. | 701/16 |
| 4,827,419 | 5/1989 | Selby, III | 701/200 |
| 5,047,942 | 9/1991 | Middleton et al. | 701/15 |
| 5,063,777 | 11/1991 | Arethens et al. | 701/14 |
| 5,111,402 | 5/1992 | Brooks et al. | 701/35 |
| 5,270,931 | 12/1993 | Appleford | 364/424.01 |
| 5,715,163 | 2/1998 | Bang et al. | 701/202 |

*Primary Examiner*—William A. Cuchlinski, Jr.
*Assistant Examiner*—Gertrude Arthur
*Attorney, Agent, or Firm*—Staas & Halsey

[57] ABSTRACT

A flight strips management system comprises a plurality of information processing devices, each information processing as management information on of aircraft control information, flight information, spot allocation information, gate allocation information, servicing information, or passenger information etc and a flight strips management device that reads management information from the information processing devices, compiles flight strips information representing aircraft movement based on the read management information, and stores the compiled flight strips information.

11 Claims, 16 Drawing Sheets

FLIGHT STRIPS MANAGEMENT METHOD AND SYSTEM

BACKGROUND OF THE INVENTION

1. Field of the Invention

The present invention relates to a flight strips management method and system for rationalizing management of movement of aircraft at an airport.

2. Description of the Related Art

Examples of airport information systems are control function systems, flight information display systems, spot (embarkation/arrival hatches or aircraft parking spaces) allocation function systems, gate (passenger entrance/exit) allocation function systems, servicing function systems, and crisis management function systems. In each information system, the respective computers manage individual items of information and the operators perform their respective functions using respective computers. Thus, the respective functions in the airport as a whole are automated to a high degree.

Also, aircraft in an airport have been managed by cards (flight strips) that give movement information such as take-off and landing times for each aircraft.

All these information systems are designed so that the individual items of information can be managed using respective computers.

Since, with such prior art information systems, information was individually managed using respective computers, for example in the case of crisis management, overall management of the condition of all the aircraft in an airport could not be achieved by any computer. The operators were therefore unable to ascertain the condition of all aircraft within an airport in real time.

Also, when an aircraft was late in arrival, or an aircraft was late in taking off, or an aircraft was cancelled, since the spot allocation function system and gate allocation function system managed their information individually, with the prior art information systems, management to reallocate an aircraft to the optimum spot or optimum gate was not possible. The operators therefore had to perform a troublesome process of allocation of optimum resources.

Accordingly, a management system is desired that can mutually link respective information systems such as crisis management function, spot allocation function, gate allocation function etc. Also, it is expected that flight strips management by electronic means will represent the kernel of such a management system.

SUMMARY OF THE INVENTION

An object of the present invention is to provide a flight strips management method and system whereby overall management can be achieved of information necessary for flight strips management, that was performed individually by airport information systems. By employing the present invention, an operator can easily ascertain the condition of all the aircraft in an airport and aircraft management functions can be performed in an optimal way.

A flight strips management system comprising:

a plurality of information processing devices, each information processing device processing management information; and a flight strips management device that reads management information from the information processing devices, compiles flight strips information representing movement information of each aircraft based on the read management information, and stores the compiled flight strips information.

Also, the flight strips management system, wherein said flight strips management device comprises:

a flight strips compilation unit that collates management information read from the information processing devices and compiles this flight strips information; a storage unit that stores flight strips information compiled by this flight strips compilation unit; and an information reading unit that reads this management information from the information processing devices and communicates it to the flight strips compilation unit.

Also, the flight strips management system, wherein said management information includes present, past and future position information and present, past and future condition information, and wherein said flight strips compilation unit collates management information read from the information processing devices and compiles the flight strips information including the present, past and future position information and the present, past and future condition information for each aircraft.

Also, the flight strips management system, wherein said flight strips management device further comprises an information display unit that displays, for each aircraft, current position of the aircraft and current condition of the aircraft, on an overall view of the airport, based on the present position information and the present condition information for each aircraft.

Also, the flight strips management system, wherein said information display unit displays, for each aircraft, past position and past condition of the aircraft based on the past position information and the past condition information for each aircraft, and future position and future condition of the aircraft based on the future position information and the future condition information for each aircraft, on a view of the airport as a whole.

Also, the flight strips management system, wherein said information reading unit reads the flight strips information from the storage unit and notified each information processing device of the flight strips information.

Also, the flight strips management system, wherein said management information further includes gate and spot allocation information, and wherein said flight strips compilation unit collates, when the gate and spot allocation information is allocated, the gate and spot allocation information in the flight strips information, based on the altered information.

Also, the flight strips management system, wherein said flight strips management device further comprises an information communication unit that is connected through a network with an aircraft to communicate with the aircraft.

Method of flight strips management wherein flight strips information representing movement information of each aircraft is compiled on the bases of management information relating to the aircraft and this flight strips information is managed, comprising the steps of:

separately processing by a plurality of information processing devices the management information;

reading from the plurality of information processing devices the management information compiling the flight strips information of each aircraft by collating the read management information;

displaying the compiled flight strips information;

storing the compiled flight strips information;

and communicating the flight strips information to the information processing devices.

Other objects and advantages of the present invention will become apparent during the following discussion in conjunction with the accompanying drawing, in which:

DESCRIPTION OF THE PREFERRED EMBODIMENTS

Embodiments of the flight strips management method and system of the present invention will be described below with reference to the drawings.

First embodiment

Figure 1:
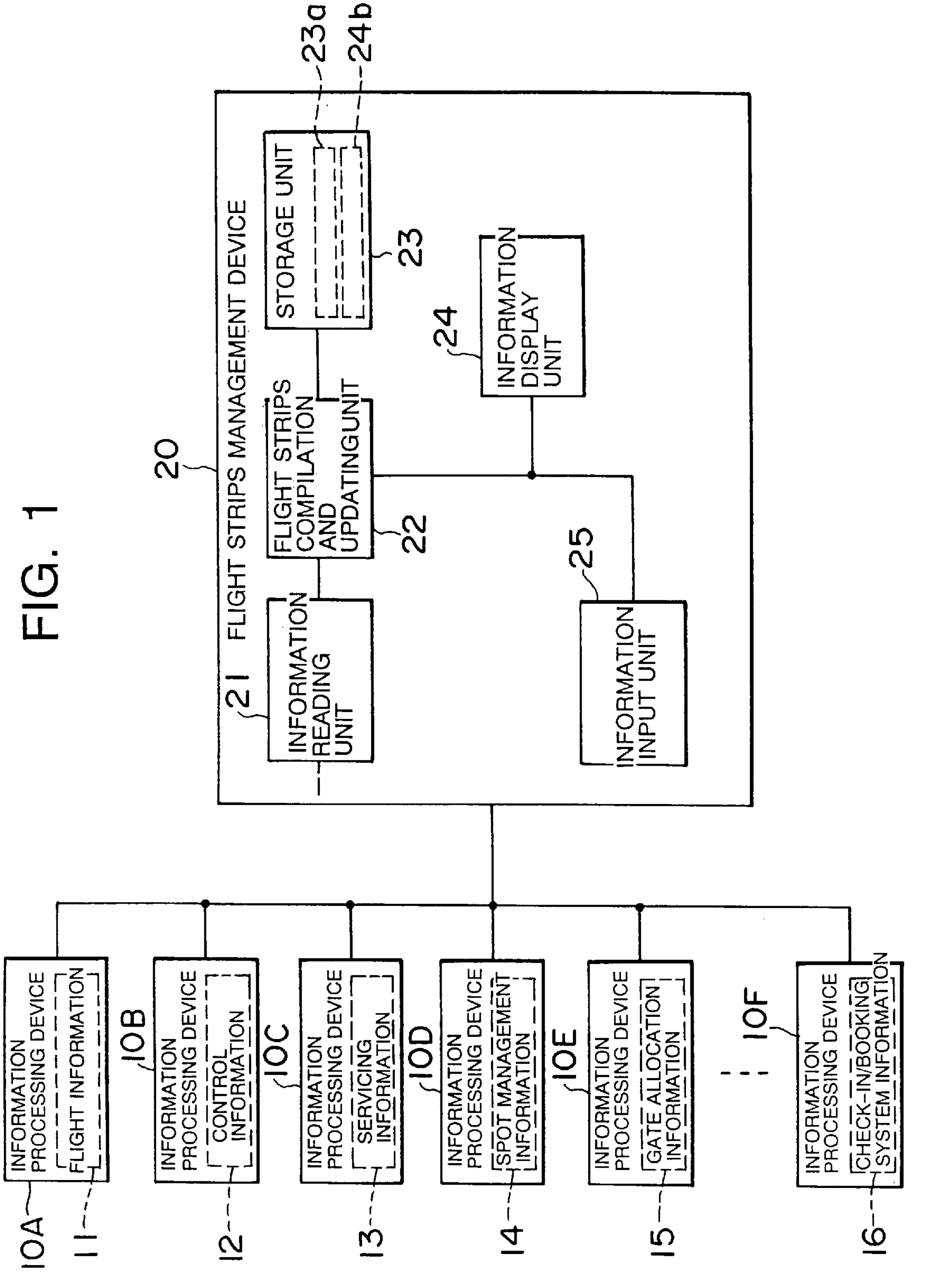
FIG. 1 is a layout block diagram showing a flight strips management system according to a first embodiment of the present invention.

FIG. 1 is a layout block diagram showing a flight strips management system according to a first embodiment of the present invention.

A flight strips management system consists of a plurality of information processing devices (subsystems) 10A to 10F, and a flight strips management device (main system) 20 connected to these plurality of information processing devices 10A to 10F.

10A is a flight information processing device that processes flight information such as aircraft condition information and/or gate allocation information for each aircraft. 10B is a control information processing device that processes control information of the air field. 10C is a service information processing device that processes service information relating to servicing of the aircraft. 10D is a spot management information processing device that performs management whereby a take-off/landing spot is allocated for take-off/landing of an aircraft on a runway. 10E is a gate allocation information processing device that performs processing whereby a gate is allocated connected to an embarkation hatch when an aircraft makes use of an embarkation hatch. 10F is a check-in/booking system information processing device that processes information relating to check-in and/or booking of passengers. Information processing devices 10A to 10F store as management information one or other of aircraft flight information, control information, service information, spot allocation information, gate allocation information and passenger information, and manage these items of management information.

Flight strips management device 20 is constituted of information reading unit 21, flight strips compiling and updating unit 22, storage unit 23, information display unit 24, and information input unit 25.

Flight strips compilation and updating unit 22 compiles the flight strips information of each aircraft based on management information relating to aircraft movement read from a plurality of information processing devices 10A to 10F. Storage unit 23 is constituted of a flight strips management database 23*a* for storing compiled flight strips information, and a map information database 23*b* for storing map information relating to an overall view of the airport and runways, embarkation hatches etc. Information reading unit 21 reads management information relating to aircraft movement from a plurality of information processing devices 10A to 10F and communicates this to flight strips compilation and updating unit 22. Also, information reading unit 21 reads flight strips information from storage unit 23 and communicates this to respective information processing devices 10A to 10F. Information display unit 24 displays flight strips information. Also, information display unit 24 displays on a screen aircraft position information and aircraft condition information on an overall view of the airport. Information display unit 24 is for example a monitor television. Information input unit 25 is for example a keyboard or a mouse. The operator inputs various instructions containing flight strips information using information input unit 25.

When flight strips information is input from information input unit 25, flight strips compilation and updating unit 22 updates the flight strips information stored in flight strips management database 23*a* using the flight strips information input from information input unit 25. Also, the updated flight strips information is read by information reading unit 21 of flight strips management device 20 and is communicated to the various information processing devices 10A to 10F.

Information processing devices 10A to 10F update the corresponding management information in their databases 11 to 16 using this updated flight strips information.

Figure 2:
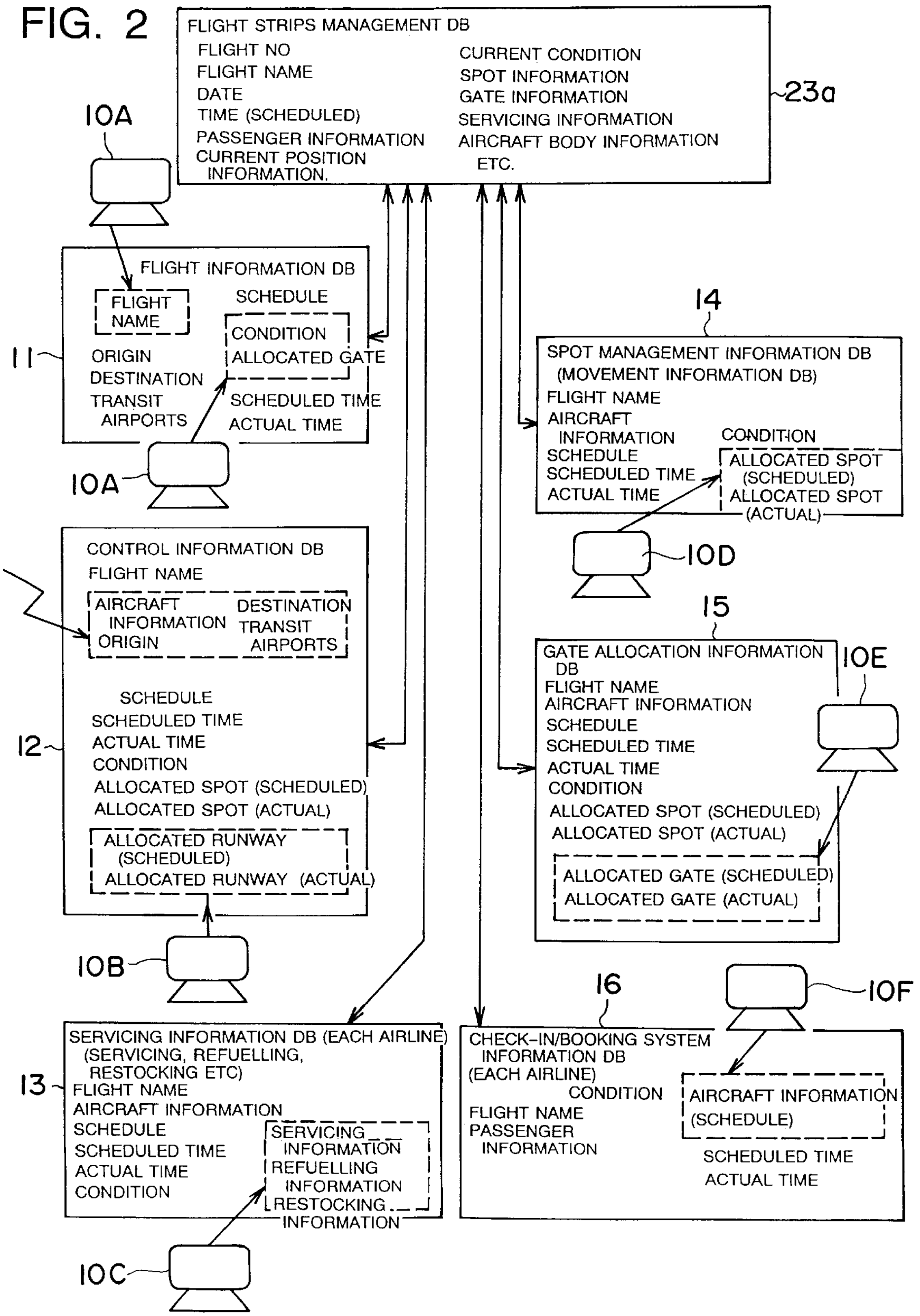
FIG. 2 is a diagram of the data bases employed in a flight strips management system.

FIG. 2 is an explanatory diagram of the databases 11 to 16 and 23*a* used in the flight strips management system of the first embodiment. It should be noted that databases 11 to 16 and 23*a* are memory media such as hard disks or magnetic disks etc.

11 indicates a flight information database. Flight information database 11 is provided in flight information processing device 10A. In flight information database 11 are stored as management information flight information such as flight name, point of origin, destination, transit airports, aircraft schedule, scheduled landing and take-off times (hereinbelow simply called "scheduled times"), actual times when take-off and landing are completed (hereinbelow simply called "actual times"), aircraft condition information, and allocated gate.

12 indicates a control information database. Control information database 12 is provided in control information processing device 10B. In control information database 12 are stored as management information control information such as flight name, aircraft information such as type of aircraft, origin, destination, transit airports, schedule, scheduled time, actual time, condition information, allocated spot (scheduled and actual), allocated runway (scheduled and actual) etc.

13 indicates a service information database. Service information database 13 is provided in service information processing device 10C. In service information database 13 are stored as management information service information such as flight name, aircraft information, schedule, scheduled time, actual time, condition information, service information (service details), refuelling information (whether refuelled or not, time taken in refuelling), restocking information (whether or not stocks have been replenished, time taken to replenish stocks) etc.

14 indicates a spot management information database. Spot management information database 14 is provided in spot management information processing device 10D. In spot management information database 14 there are stored as management information spot management information such as flight name, aircraft information, schedule, scheduled time, actual time, condition information, allocated spot (scheduled, actual) etc.

15 indicates a gate allocation information database. Gate allocation information database 15 is provided in gate allocation information processing device 10E. In gate allocation information database 15 are stored, as management information, gate allocation management information such as flight name, aircraft information, schedule, scheduled time, actual time, condition information, allocated spot (scheduled, actual), allocated gate (scheduled, actual).

16 indicates a check-in/booking system information database. Check-in/booking system information database 16 is provided in check-in/booking system information processing device 10F. In check-in/booking system information database 16 are stored as management information check-in/booking system information such as flight name, passenger information, scheduled time, actual time, aircraft information, and schedule etc.

23*a* indicates a flight strips management database. In flight strips management database 23*a* are stored flight strips information compiled by flight strips compilation and updating unit 22. In flight strips management database 23*a* there are stored flight number, flight name, date, schedule, passenger information, current position information, current condition, spot information, gate information, service information, and aircraft body information etc.

Figure 3:
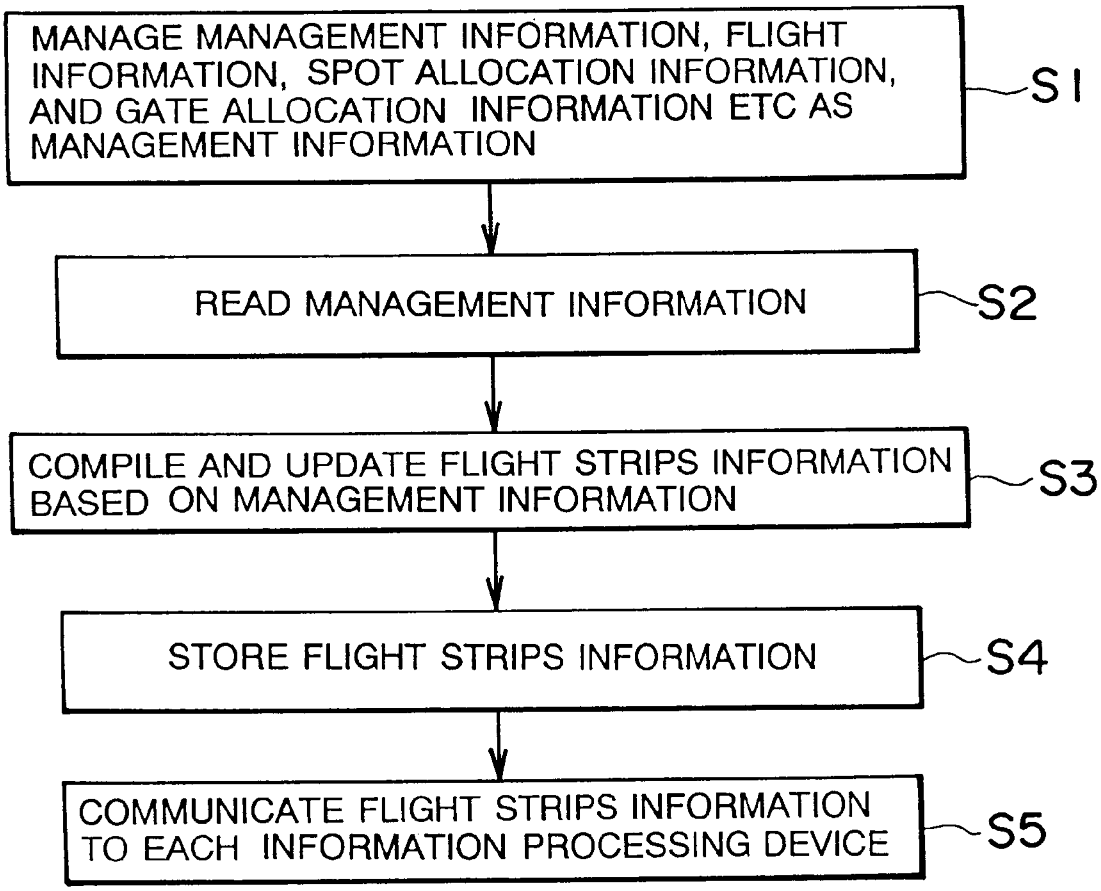
FIG. 3 is a flow chart explaining in outline the operation of the flight strips management system.

FIG. 3 is a flow chart explaining in outline the operation of a flight strips management system.

The various information processing devices 10A to 10F store as management information in their respective databases 11 to 16 one or other of aircraft flight information, control information, service information, spot allocation information, gate allocation information, and passenger information etc as management information, and manage these items of management information (step S1). Information reading unit 21 reads the management information relating to aircraft movement from each information processing devices 10A to 10F and communicates this to flight strips compiling and updating unit 22 (step S2). Flight strips compilation and updating unit 22 collates the management information regarding aircraft movement and compiles and updates the flight strips information for each aircraft (step S3). Storage unit 23 stores the compiled flight strips information (step S4). Information reading unit 21 reads the flight strips information from storage unit 23 and communicates this to respective information processing devices 10A to 10F (step S5). Information processing devices 10A to 10F store, as the most recent management information, the flight strips information that has been communicated to them.

Figure 4:
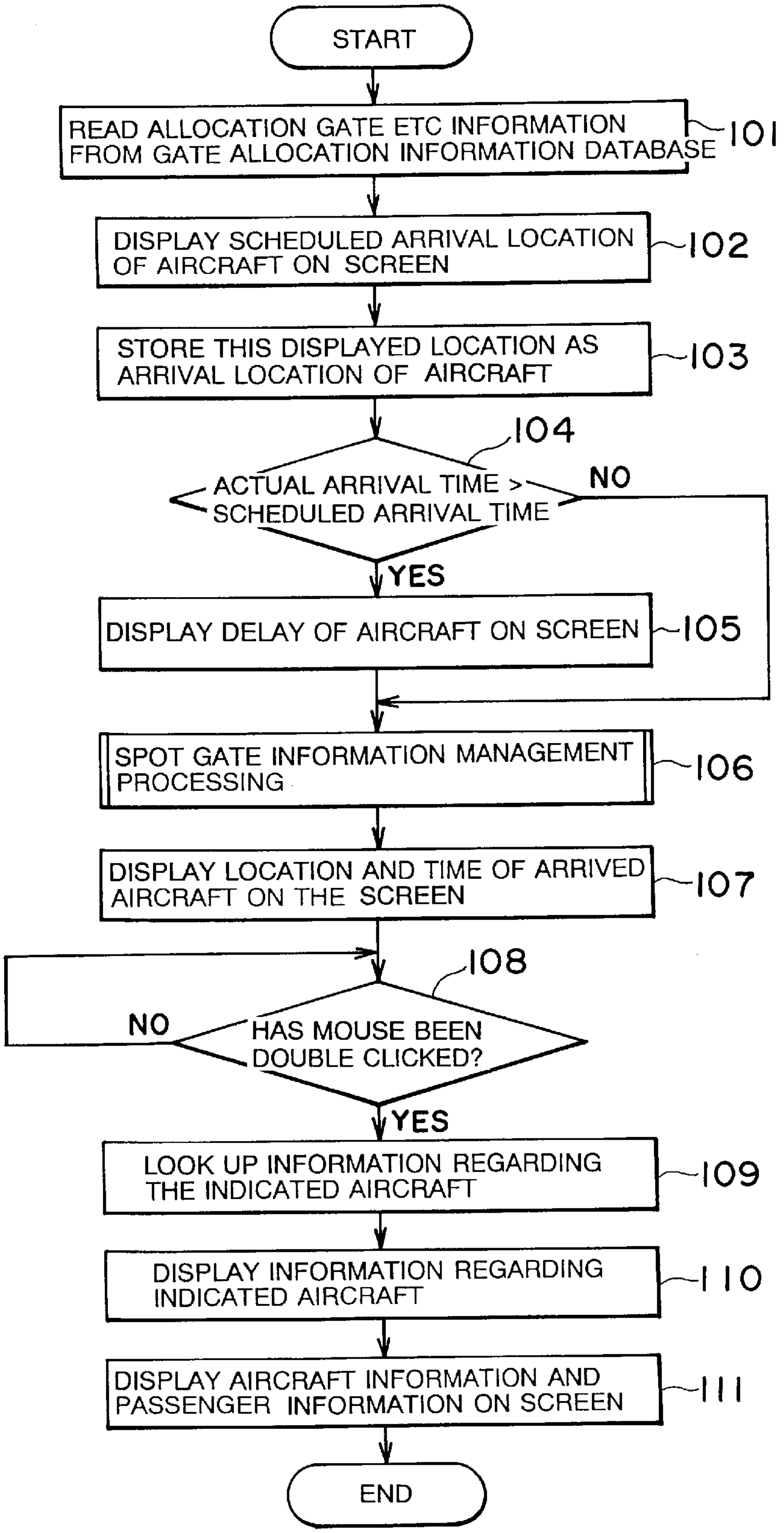
FIG. 4 is a flow chart showing details of the processing executed by the flight strips management device on arrival of an aircraft in order to update the flight strips information.

FIG. 4 is a flow chart showing details of the processing executed for flight strips information updating by flight strips management device 20 on arrival of an aircraft. It will be assumed that these items of management information are managed by respective information processing devices 10A to 10F and stored as management information in the databases 11 to 16 which they respectively possess. It will also be assumed that flight strips management device 20 performs the processing of steps S1 to S4 of FIG. 3 and that the flight strips information of all the aircraft is stored in flight strips management database 23*a* for each aircraft.

Processing is started in response to some prescribed operation. For example, processing may be started when the operator inputs a flight number using information input unit 25. Information reading unit 21 of flight strips management device 20 reads the management information relating to aircraft movement corresponding to the flight number from gate allocation information database 15, and communicates this to flight strips compilation and updating unit 22. For example, it reads the gate allocation information such as scheduled arrival time, condition, allocated gate (scheduled), and allocated spot (scheduled) in respect of the aircraft in question and communicates these to flight strips compilation and updating unit 22 (step 101).

Figure 5:
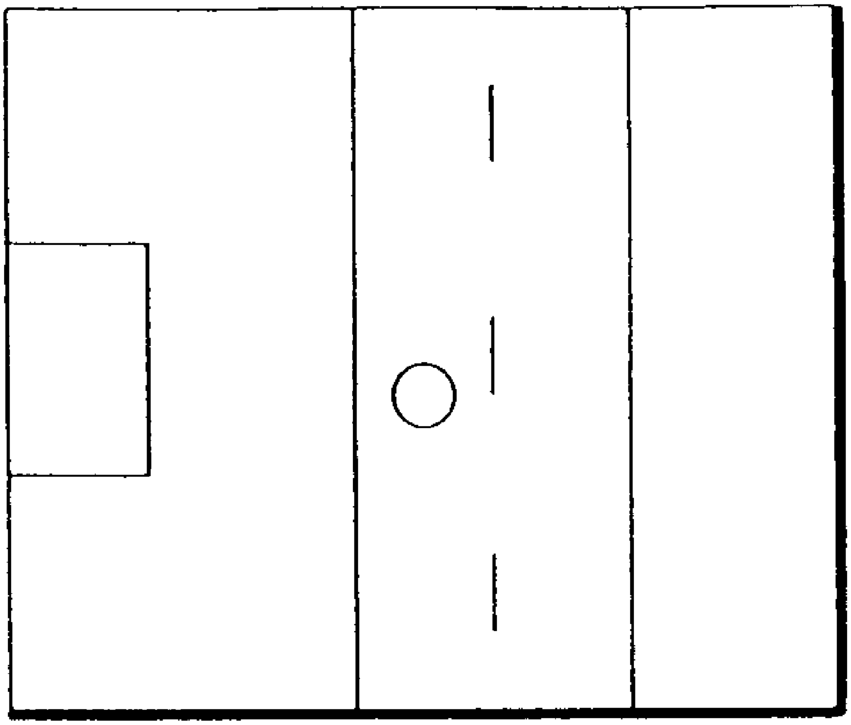
FIG. 5 is a view illustrating the scheduled arrival position of an aircraft.

Next, flight strips compilation and updating unit 22 communicates through information display unit 24 the gate allocation information (position information and condition information of the aircraft) that was notified in step 101, together with the view of the airport as a whole and map information relating to runways and embarkation hatches etc within map information database 23*b*. Using the map information and gate allocation information that have been communicated, information display unit 24 displays the position information and condition information of the aircraft on the screen (step 102). FIG. 5 shows an example of a graphic illustrating the position information and condition information of an aircraft. In this Figure, the location indicated by the circle indicates the scheduled location of arrival of the aircraft. The operator performs the control function whilst referring to the flight strips information displayed on information display unit 24.

By means of the gate allocation information called in step 101, flight strips compilation and updating unit 22 updates for each aircraft the flight strips information in flight strips management database 23*a*. For example, the flight strips information is updated (step 103) by the position information (scheduled location of arrival) of the aircraft displayed in step 102. It should be noted that if the allocated spot information and allocated gate information are stored in information databases 11 to 16, these locations (gate and spot) cannot be used by another aircraft until this aircraft has completed the functions to be performed in the allocated spot and allocated gate. The same applies when the spot information and gate information are stored in flight strips management database 23*a*.

Based on the arrival time that is read in step 101, flight strips compilation and updating unit 22 decides whether or not the actual arrival time of the aircraft is later than the scheduled arrival time; if the actual arrival time is ascertained to be later than the scheduled arrival time, processing advances to step 105. On the other hand, if it is decided not to be later, processing advances to step 106 (step 104).

In step 105, flight strips compilation and updating unit 22 communicates to information display unit 24 the delay of the aircraft. The fact that the aircraft has been delayed is displayed on the screen of information display device 24. The processing of flight strips compilation and updating unit 22 then advances to step 106.

In step 106, flight strips compilation and updating unit 22 performs the spot gate information management functions including updating of gate allocation information and spot allocation information. This spot and gate information management processing will be described later.

Figure 7:
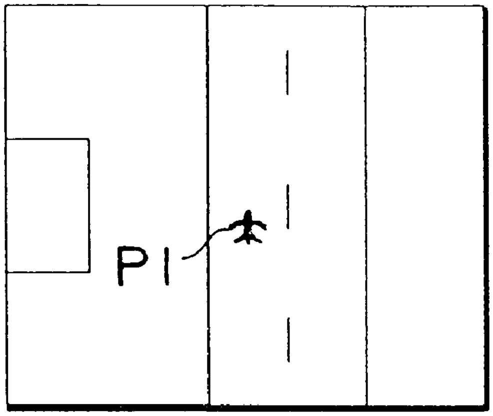
FIG. 7 is a view showing the actual arrival position of an aircraft.

When the processing of step 106 is terminated on arrival of an aircraft, flight strips compilation and updating unit 22 reads the information: flight name, time, gate information, and spot information from the flight strips information that is stored in flight strips management database 23*a*, and communicates these to information display unit 24. Using the information that has thus been communicated, information display unit 24 displays on its screen the name of the aircraft that has arrived and the position in which it has arrived (step 107). FIG. 7 is a view showing aircraft name P1 of an aircraft that has arrived, and its actual arrival position.

Figure 8:
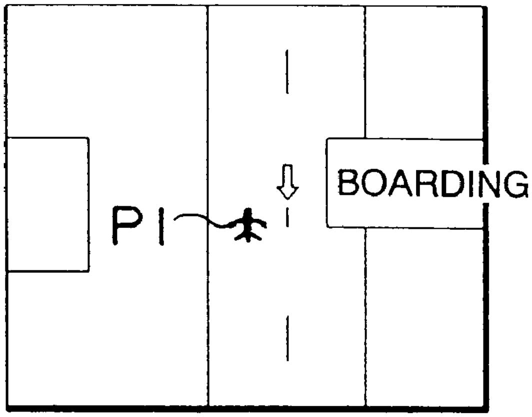
FIG. 8 is a view showing related information of an aircraft.

Using the mouse of the information input unit 25, the operator then drags the cursor on to the aircraft P1 indicated in the drawing. The operator then makes a double click at the cursor position, with the meaning of clicking on the Windows icon. Flight strips compilation and updating unit 22 monitors whether or not the mouse has performed a double click in the condition with the aircraft displayed on information display unit 24 (step 108). If there has been a double click, flight strips compilation and updating unit 22 looks up the flight strips information in flight strips management database 23*a*, and reads the condition information of the aircraft (for example, whether it has completed arrival or is embarking) (step 109). This condition information is then communicated to information display unit 24, whereupon information display unit 24 displays the condition information that has been communicated to it (step 110). For example, as shown in FIG. 8, the condition information of aircraft P1 is displayed as "boarding".

Figure 9:
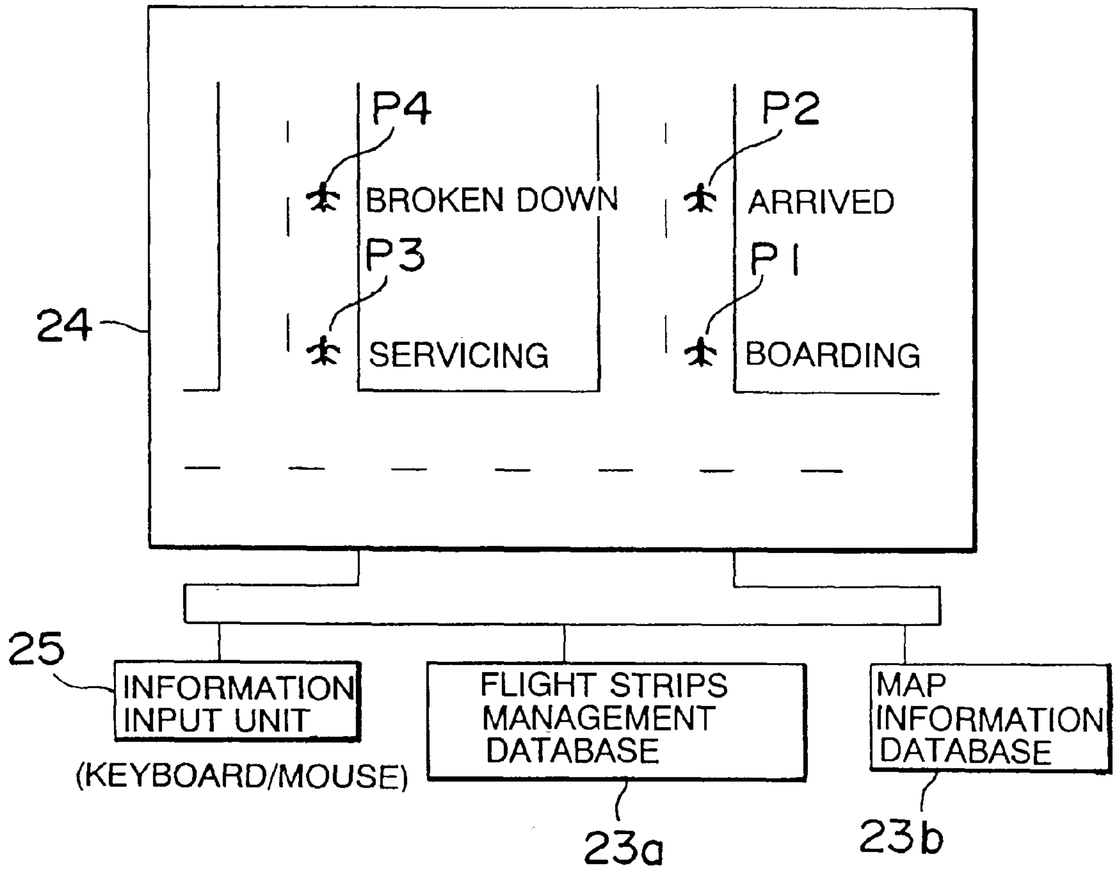
FIG. 9 is a view wherein there is displayed on a screen the position and condition of a plurality of aircraft.

If, as shown in FIG. 9, a plurality of aircraft P1 to P4 are displayed on the screen, the operator can display the condition information of each aircraft by successively double-clicking on aircraft P1 to P4. In FIG. 9, the condition information of aircraft P2 is displayed as "arrived", the condition information of aircraft P3 is displayed as "servicing", and the condition information of aircraft P4 is displayed as "broken down".

Also, information reading unit 21 reads from control information database 12 and check-in/booking system information database 16 aircraft information and passenger information etc; using this information that has been read, information display unit 24 displays the aircraft information and passenger information on separate display columns (Windows) of the screen (step 111).

Figure 6:
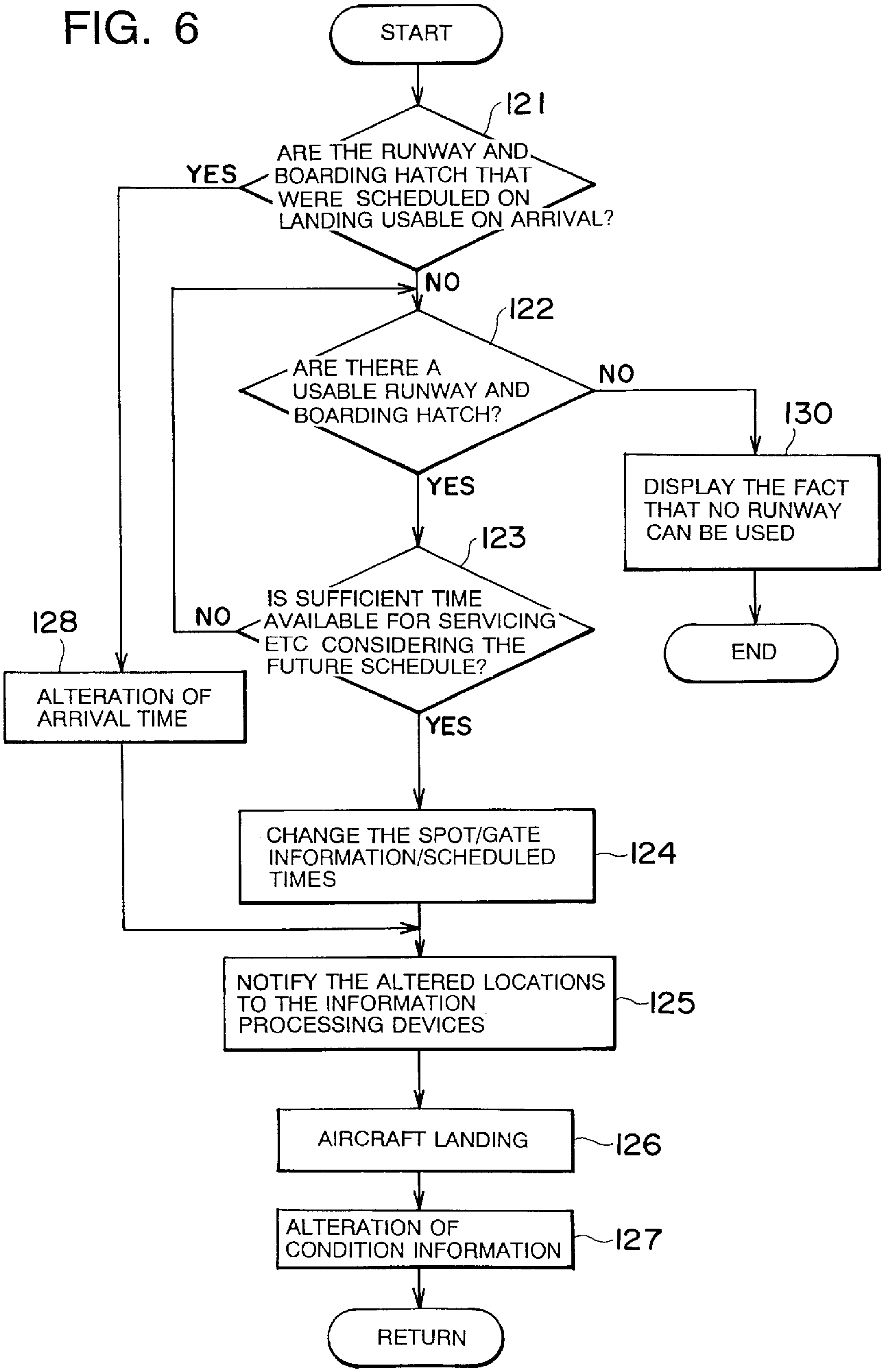
FIG. 6 is a flow chart illustrating spot gate information management processing.

FIG. 6 is a flow chart showing the spot/gate information management processing subroutine executed by the steps of FIG. 4.

First of all, using the flight strips information for all the aircraft, flight strips compilation and updating unit 22 ascertains whether or not the runway and boarding hatch that were initially scheduled are usable at the time of actual arrival of the aircraft (step 121).

If the initially scheduled runway and boarding hatch are usable, without changing the gate allocation information and spot allocation information in the flight strips information for the aircraft, only the information regarding scheduled arrival time is changed to a time at which arrival is actually possible (step 128). The altered flight strips information is read by information reading unit 21 of flight strips management device 20, and is communicated to each information processing devices 10A to 10F (step 125). Using this altered flight strips information, information processing devices 10A to 10F alter the corresponding management information and execute the operations required by the alteration. For example, the scheduled time of arrival of control information database 12 is altered to the actual scheduled time of arrival. The aircraft in question can therefore land at the altered scheduled time of arrival (step 126).

In contrast, if the initially scheduled runway and boarding hatch are unusable in the processing of step 121, flight strips compilation and updating unit 22 uses the flight strips information for all the aircraft to search for a runway and boarding hatch that are usable (step 122). If there is no usable runway and boarding hatch, information display unit 24 displays a message to the effect that no runway or boarding is usable (step 130). If no runway or boarding hatch can be used, spot/gate information management processing is terminated. The operator ascertains that the aircraft cannot be dealt with by this airfield and guides it to another airfield.

If there are a usable runway and boarding hatch, flight strips compilation and updating unit 22 examines whether this aircraft can take sufficient time for servicing etc with this runway and boarding hatch. That is, by referring to the flight strips information (allocated spot information, allocated gate information) in respect of other aircraft, it studies whether or not it could happen that other aircraft would be using this runway and boarding hatch whilst the aircraft in question was being serviced (step 123). If sufficient time cannot be obtained for servicing etc, processing returns to step 122, and a usable runway and boarding hatch are again sought. On the other hand, if sufficient time is available for servicing etc, flight strips compilation and updating unit 22, in the flight strips information of this aircraft, alters the allocated spot information, allocated gate information, and scheduled arrival time, and stores these in flight strips management database 23*a* (step 124). The altered flight strips information is read by information reading unit 21 of flight strips management device 20, and is communicated to the respective information processing devices 10A to 10F (step 125). Using the altered flight strips information, information processing devices 10A to 10F alter the corresponding management information and execute the operations required by this alteration. For example, the allocated spot information in spot management information database 14 is changed to the after-alteration spot; the allocated gate information in gate allocation information database 15 is changed to the after-alteration gate. Consequently, arrival of the aircraft in question becomes possible (step 126).

When the aircraft arrives after the processing of step 126, each information processing device 10A to 10F stores the landing time in the actual arrival time of its individual database, and stores the allocated gate (actual) and allocated spot (actual), and also changes the condition information of each database to "arrived" and stores this (step 127). Next, processing returns to the processing of FIG. 4.

In this way, flight strips management device 20 can process the respective database management information in a unified way. The operator can therefore easily ascertain the current position information and condition information of all aircraft in the airport.

With this first embodiment, flight strips management device 20 can manage in an integrated manner the management information stored in the databases of the respective information processing devices 10A to 10F. By the use of this flight strips management system, an operator can easily grasp the movement information of all the aircraft in the airport and so can perform airport management in an optimum way.

Second embodiment

A second embodiment of a flight strips management system will now be described. The point of difference between the first embodiment and the second embodiment is that, in addition to the current movement information of the aircraft, past movement information of the aircraft is displayed on the screen of the information display unit.

Figure 10:
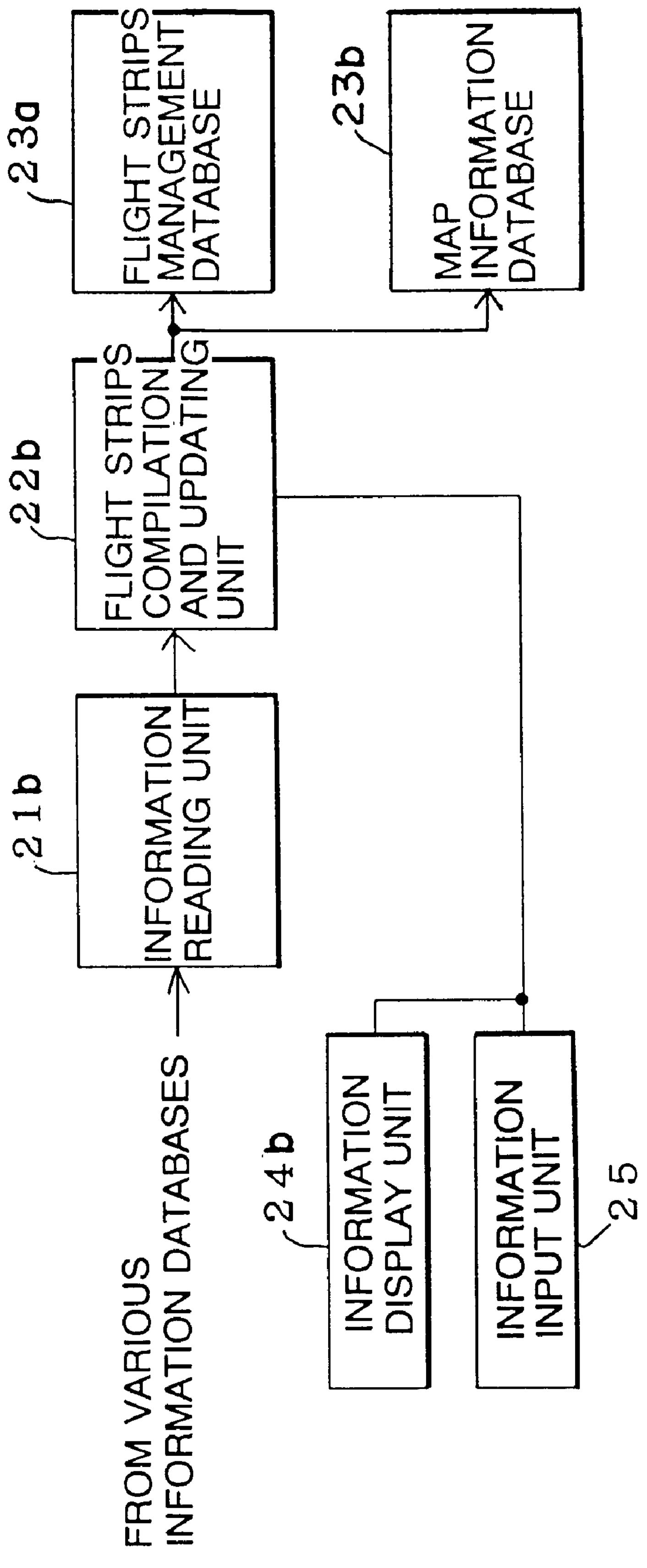
FIG. 10 is a layout block diagram illustrating a flight strips management device according to a second embodiment of the present invention.

FIG. 10 is a layout block diagram of a flight strips management device according to this second embodiment.

Flight strips management device 20 comprises information reading unit 21*b*, flight strips compilation and updating unit 22*b*, flight strips management database 23*a*, map information database 23*b*, information display unit 24*b*, and information input unit 25.

It should be noted that, when flight strips compilation and updating unit 22*b* stores in flight strips management database 23*a* the current position information that has been compiled and compiles the current condition information, this current position information and current condition information can be stored together with past position information and past condition information.

For example, using the gate allocation information and service information read by information reading unit 21*b*, flight strips compilation and updating unit 22*b* compiles the current position information and current condition information of the aircraft and communicates these to information display unit 24*b* together with map information. Also, flight strips compilation and updating unit 22*b* reads the position information and condition information compiled in the passed from flight strips management database 23*a* and communicates these to information display unit 24*b* together with map information.

Information display unit 24*b* displays on its screen the current position information and current condition information of the aircraft and the past position information and past condition information compiled by flight strips compilation and updating unit 22*b*.

Figure 11:
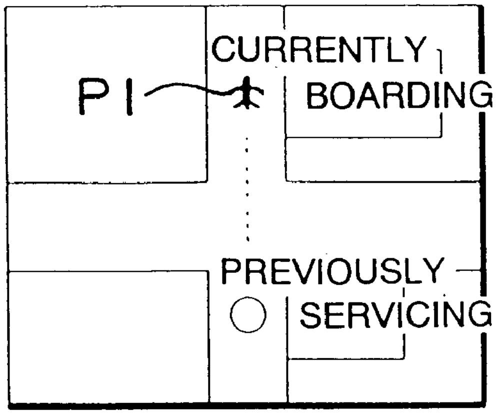
FIG. 11 is an example display wherein there are displayed on an information display unit current position information and current condition information, and past position information and past condition information of an aircraft.

FIG. 11 shows an example display displayed on the information display unit of the current position information and current condition information and past position information and past condition information of an aircraft. On information display unit 24*b* there are displayed the current position information and condition information ("boarding") of an aircraft P1, and there are displayed the past position information (circle symbol) and condition information ("service") of this aircraft P1.

With the arrangement of the second embodiment, the operator can easily ascertain the current and past condition information of aircraft P1.

Also, flight strips compilation and updating unit 22*b* may be constituted so as to use the actual time of the gate allocation information and actual time of the service information to compile the current position information and current condition information of the aircraft, and to use the scheduled time of the gate allocation information and scheduled time of the service information to compile the future position information and future condition information of the aircraft. In this case, flight strips compilation and updating unit 22*b* compiles the current position information and current condition information and future position information and future condition information of the aircraft and communicates these, together with map information, to information display unit 24*b*.

Information display unit 24*b* displays on its screen the current position information and current condition information and future position information and future condition information of the aircraft compiled by flight strips compilation and updating unit 22*b*.

Figure 12:
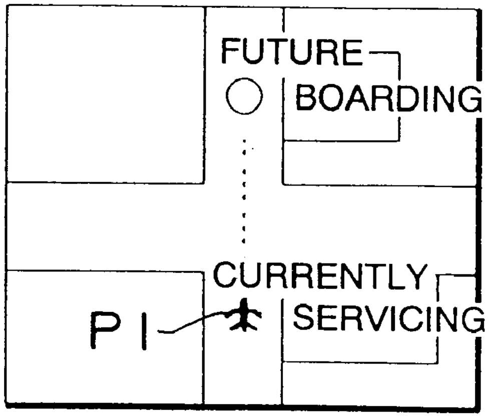
FIG. 12 is an example display wherein there are displayed on an information display unit current position information and current condition information, and future position information and future condition information of an aircraft.

FIG. 12 is an example display in which are displayed on the information display unit the current position information and current condition information and the future position information and future condition information of the aircraft. On information display unit 24*b* there are displayed the current position information and condition information ("servicing") of aircraft P1 and there are displayed the future position information (circle symbol) and condition information ("boarding") of this aircraft P1.

With the construction of the second embodiment, the operator can easily ascertain the present and future condition information of aircraft P1.

Third embodiment

Next, a third embodiment of a flight strips management system will be described. The point of difference of the third embodiment from the first embodiment is that there is provided a function of collating gate allocation information and spot allocation information when the actual time of takeoff or arrival of an aircraft is later than the scheduled time or when an aircraft is cancelled, or an extra flight is added.

Figure 13:
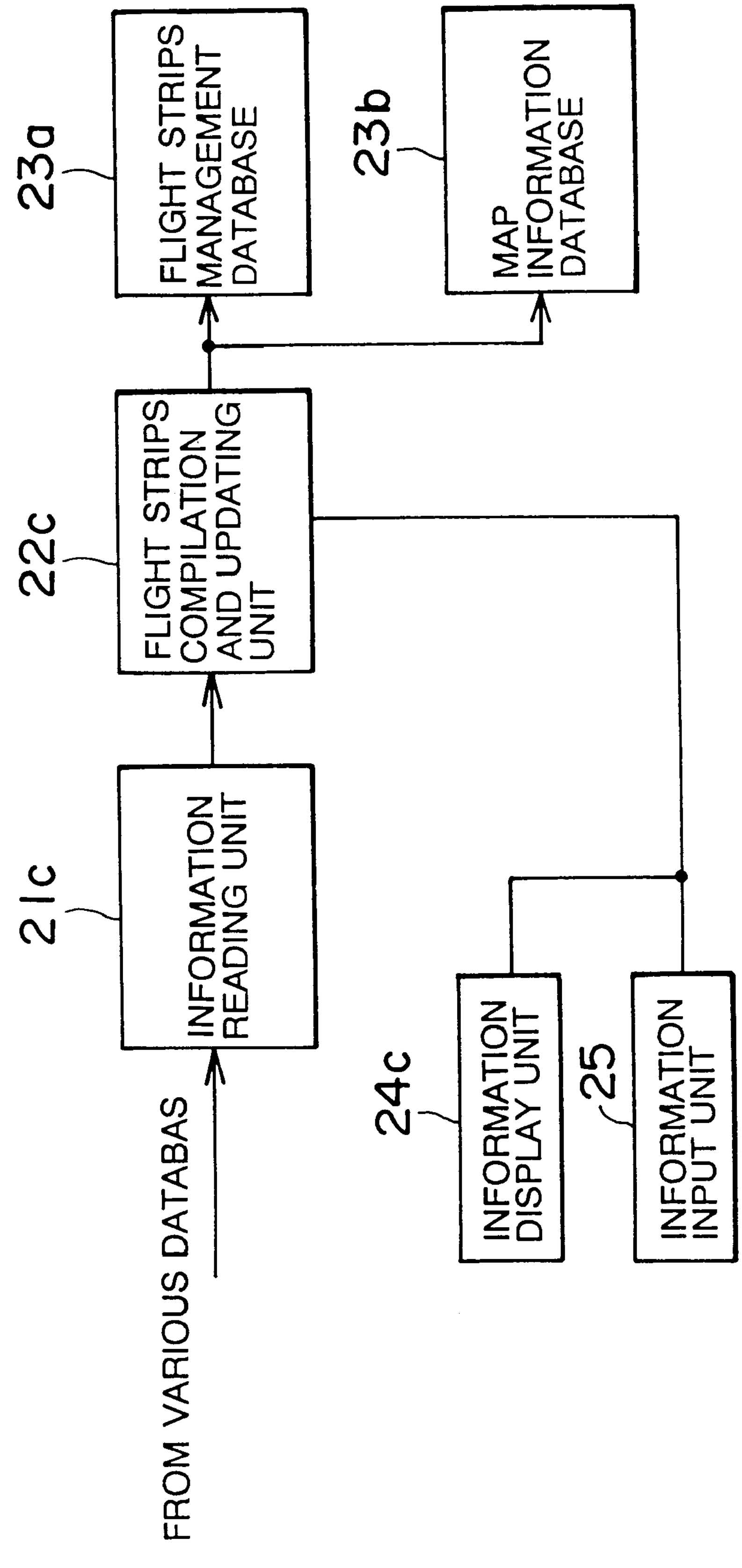
FIG. 13 is a layout block diagram illustrating a flight strips management device according to a third embodiment of the present invention.

FIG. 13 is a layout block diagram of a flight strips management device according to the third embodiment.

Flight strips management device 20 comprises an information reading unit 21*c*, flight strips compilation and updating unit 22*c*, flight strips management database 23*a*, map information database 23*b*, information display unit 24*c*, and information input unit 25.

Information reading unit 21*c* reads management information constituted by gate allocation information and spot allocation information and communicates this to flight strips compilation and updating unit 22*c*. Also, if there is any change in the gate allocation information or spot allocation information after flight strips information has been collated, information reading unit 21*c* reads this changed flight strips information from flight strips compilation and updating unit 22*c* and communicates this to each information processing devices 10A to 10F.

If the actual time of takeoff or arrival of an aircraft is later than the scheduled time or if an aircraft is cancelled or an extra flight is added, flight strips compilation and updating unit 22*c* of this third embodiment uses the management information (for example, gate allocation information and spot allocation information) input from information input unit 25 to collate gate allocation information and spot allocation information read by information reading unit 21*c*.

Information display unit 24*c* displays on its screen the gate allocation information and spot allocation information compiled by flight strips compilation and updating unit 22*c*.

Figure 14:
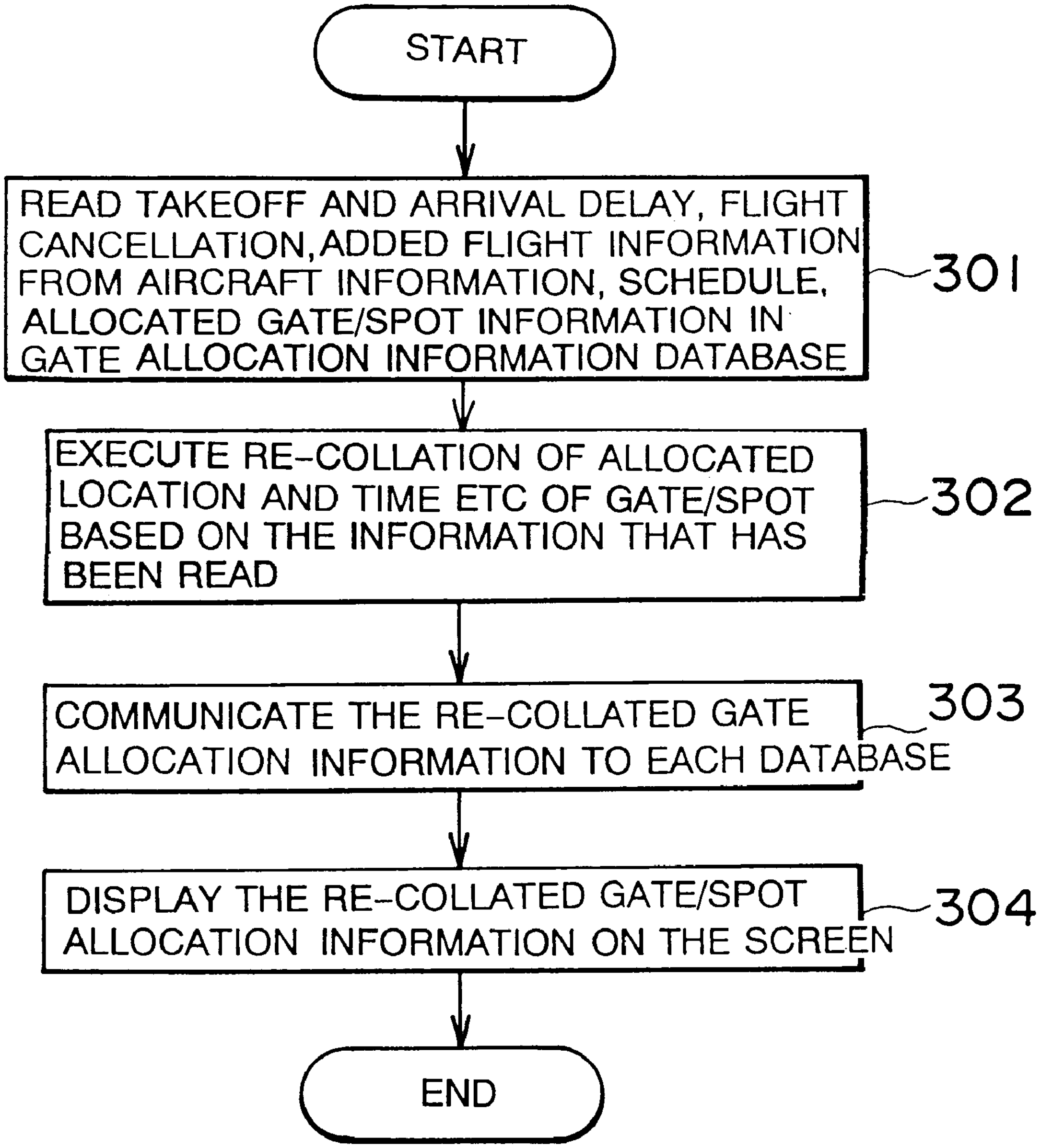
FIG. 14 is a flow chart illustrating the collation processing performed by the flight strips management system of the third embodiment.

FIG. 14 shows a flow chart illustrating the collation processing in the third embodiment. This Figure illustrates the case of collation of gate and spot allocation information occasioned by arrival delay, takeoff delay, sudden cancellation, or an added flight of aircraft.

First of all, information reading unit 21*c* reads from management information such as aircraft information scheduled time, allocated gate, allocated spot etc in gate allocation information database 15 management information such as takeoff/arrival delay, cancellation, or additional flight, and communicates this to flight strips compilation and updating unit 22*c* (step 301).

Next, information display unit 24*c* displays the management information communicated by information reading unit 21*c*. Referring to the display of information display unit 24*c*, the operator inputs management information for dealing with arrival delay, takeoff delay, sudden cancellation, or additional flight, using information input unit 25. Using the management information input from information input unit 25, flight strips compilation and updating unit 22*c* executes re-collation of allocation information such as allocated location and time of the gate and spot (step 302).

Furthermore, flight strips compilation and updating unit 22*c* communicates the re-collated gate/spot allocation information to flight strips management database 23*a*, where it is stored. Also, information reading unit 21*c* communicates to each database (step 303) including gate allocation information database 15, the re-collated gate/spot allocation. Simultaneously, information display unit 24*c* displays on its screen the re-collated gate/spot allocation information (step 304). When the re-collated gate/spot allocation information has been displayed, processing is terminated.

Figure 15:
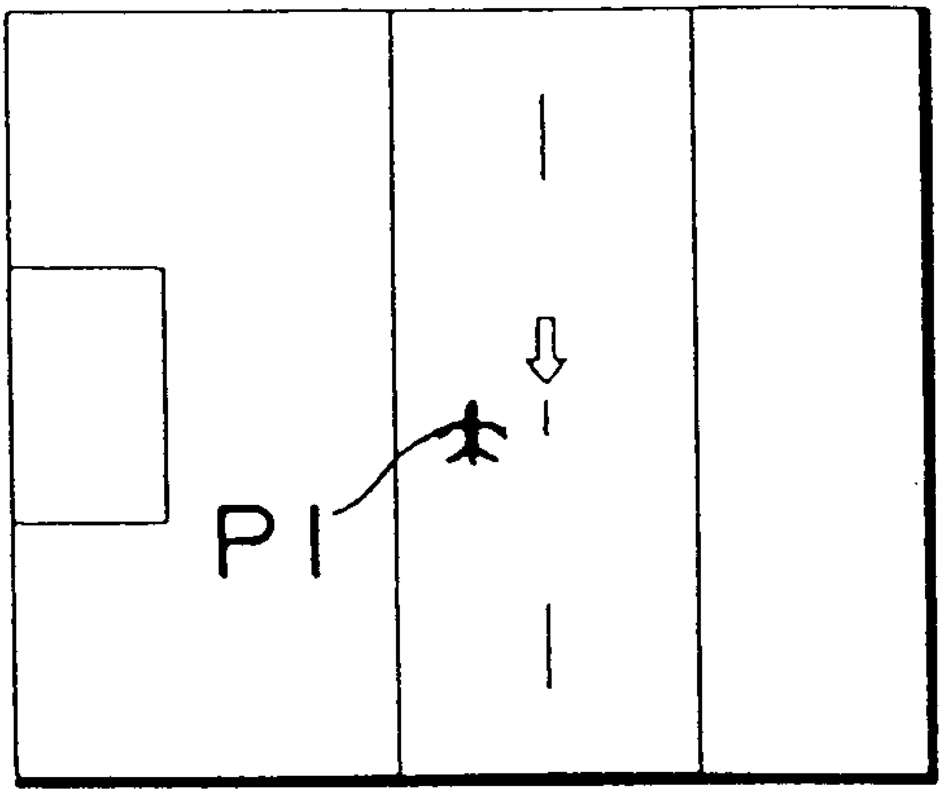
FIG. 15 is a view showing the re-collated aircraft positions.

FIG. 15 is an example wherein the re-collated spot allocation information is displayed on the screen of the information display unit. Position information of aircraft P1 showing the spot allocation information that has been re-collated is displayed on information display unit 24*c*.

Thus, when management information for dealing with arrival delay, takeoff delay, sudden cancellation or additional flight of an aircraft is input, the flight strips management device uses this input management information to recompile the flight strips information. Also, the flight strips information device communicates this re-collated flight strips information to each information processing device. Consequently, the load of each function on the operator is reduced to a minimum.

Fourth embodiment

Next, a flight strips management system according to a fourth embodiment will be described.

Figure 16:
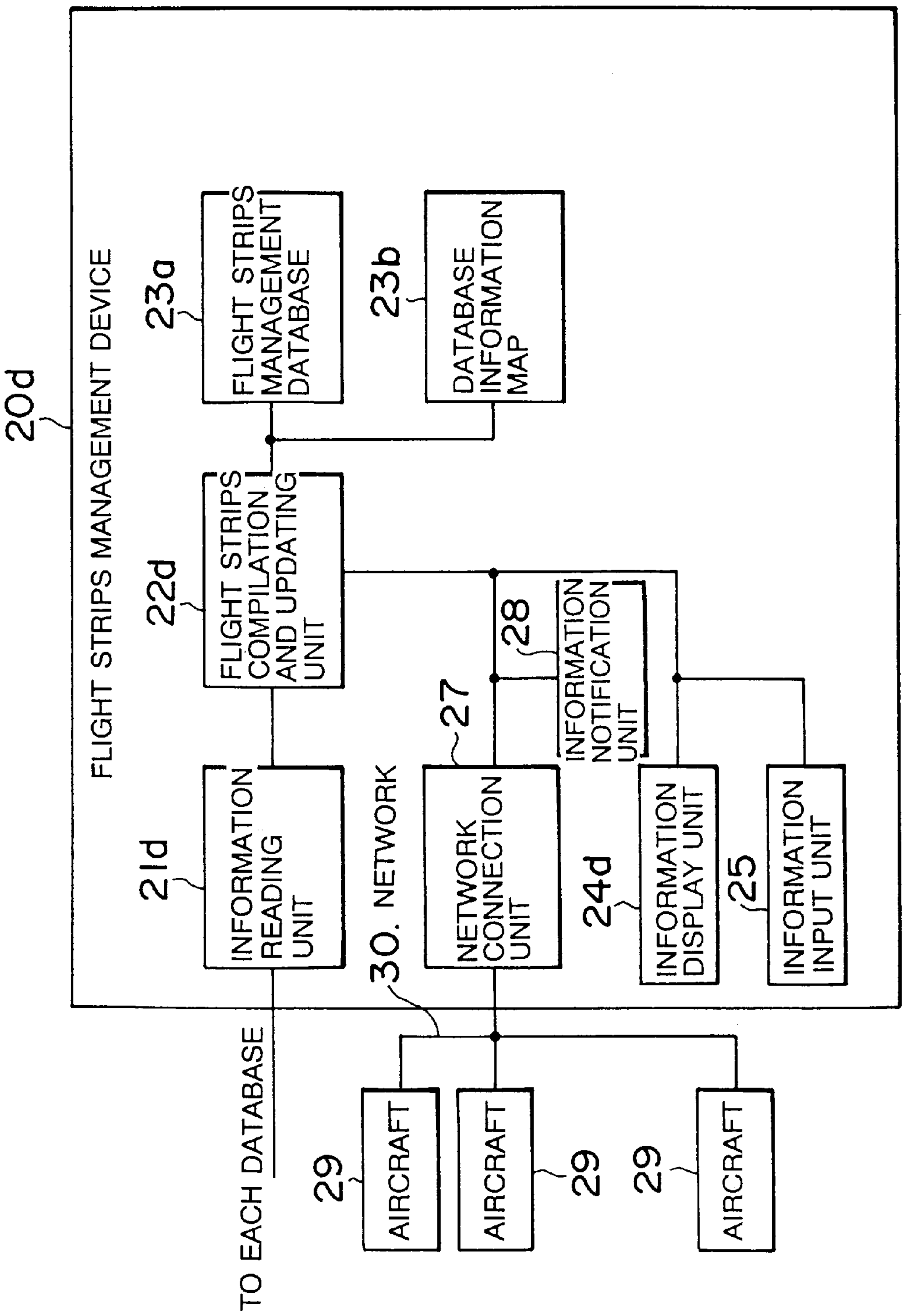
FIG. 16 is a layout block diagram showing a flight strips management device according to a fourth embodiment of the present invention.

FIG. 16 is a layout block diagram of a flight strips management device according to a fourth embodiment of the present invention.

Flight strips management device 20*d* comprises information reading unit 21*d*, flight strips compilation and updating unit 22*d*, flight strips management database 23*a*, map information database 23*b*, information display unit 24*d*, and information input unit 25.

Furthermore, flight strips management device 20*d* comprises a network connection unit 27 that performs connection control with a plurality of aircraft 29 through network 30, and an information notification unit 28 that is connected to this network connection unit 27.

Network connection unit 27 effects connection with a plurality of aircraft 29 through network 30 in response to input designation from information input unit 25. Also, under input designation from input unit 25, network connection unit 27 effects connection of information notification unit 28 with network 30. Consequently, network connection unit 27 is made capable of communicating information between communication notification unit 28 and a plurality of aircraft 29.

Information notification unit 28 consists for example of a microphone provided in information input unit 25. Once network connection unit 27 connects information notification unit 28 and network 30, an operator can use information notification unit 28 to communicate information individually to respective aircraft 29 through network 30, and can communicate information simultaneously to a plurality of aircraft 29.

Also, if a disaster occurs, the location of occurrence of the disaster can be displayed on the screen of information display unit 24*d*. In response to the screen display of this location where a disaster has occurred, an operator can use information notification unit 28 to notify relevant peripheral sites of the occurrence of a disaster, through network 30.

Figure 17:
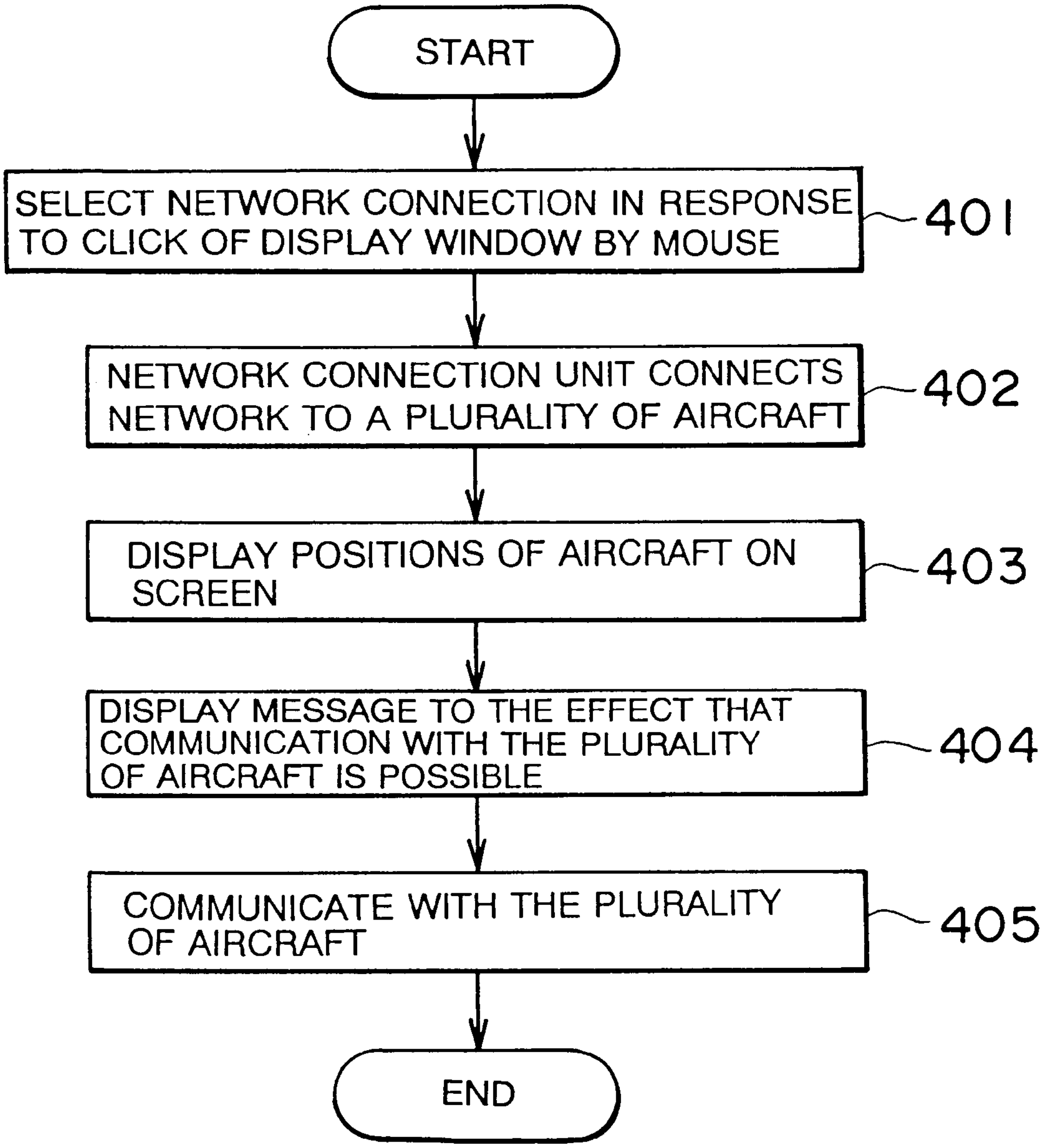
FIG. 17 is a flow chart showing the processing that is executed by the flight strips management system of the fourth embodiment.

FIG. 17 is a flow chart illustrating execution processing in the fourth embodiment. It is to be assumed that flight strips management database 23*a* has already compiled and stored the flight strips information including the position information and condition information of aircraft P1.

Also, in the same way as in the first embodiment, in the fourth embodiment also, the operator selects "network connection" from the menu screen of the display window that is displayed by double-clicking the mouse in accordance with a prescribed operation. When this is done, flight strips management device 20*d* communicates the instruction "network connection" to network connection unit 27 (step 401).

Network connection unit 27 connects network 30 and aircraft 29 (step 402).

In addition, flight strips compilation and updating unit 22*d* reads the position information and condition information of aircraft P1 from flight strips management database 23*a*, reads the map information from map information database 23*b*, and communicates these to information display unit 24*d*. The position information of aircraft P1 is displayed on position information unit 24*d* (step 403). The operator can ascertain the position of the aircraft from the screen. Thereupon, the operator designates the aircraft with which he wishes to communicate, using information input unit 25.

Figure 18:
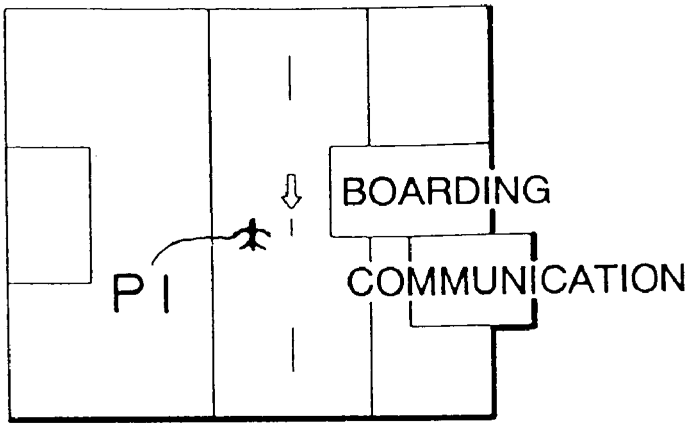
FIG. 18 is a diagram illustrating communication of aircraft in the fourth embodiment.

When this is done, network connection unit 27 allocates a radio frequency to the aircraft with which communication is desired. When a radio frequency is allocated, and communication with the aircraft P1 becomes possible, this is displayed on the screen of information display unit 24*d* (see FIG. 18, step 404).

When communication has become possible, information notification unit 28 transmits the voice of the operator by the allocated radio frequency (step 405). For example, communication with aircraft P1 during boarding is performed using a microphone etc as information notification unit 28.

Thus, with this fourth embodiment, the flight strips management device 20*d* can transmit the operator's voice to an aircraft 29 with which communication is desired. The operator can therefore perform airport management smoothly.

Figure 19:
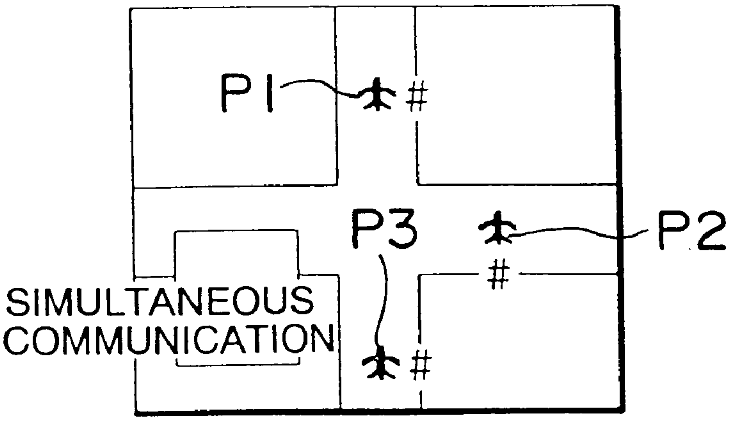
FIG. 19 shows a display screen when simultaneous communication is made possible in respect of aircraft P1 to P3.

Also, a construction is possible whereby network 30 and a plurality of aircraft 29 can be simultaneously connected by network communication unit 27 in the event of an urgent disaster such as a fire. FIG. 19 shows the display screen when simultaneous communication has been made possible with respect to aircraft P1 to P3. With this arrangement, flight strips management unit 20*d* can transmit the voice of the operator for urgent communication simultaneously to a plurality of aircraft 29. Urgent steps can therefore be performed in each aircraft.

Furthermore, in particular, if a fault has occurred whereby damage might ensue to the entire airport, an arrangement is possible whereby network connection unit 27 can make connection through public circuits with information communication unit 28 and relevant peripheral sites. With such an arrangement, flight strips management unit 20*d* can transmit the voice of the operator for urgent communication to relevant peripheral sites through public circuits.

As this invention may be embodied in several forms without departing from the spirit of essential characteristic thereof, the present embodiment is therefore illustrative and not restrictive, since the scope of the invention is defined by the appended claims rather than by the description pending them, and all changes that fall within meets and bounds of the claims, or equivalence of such meets and bounds are therefore intended dy the claims.

What is claimed is:

1. A flight strips management system comprising:

a plurality of airport operation systems, each processing management information concerning an airport's resource allocated to an aircraft; and a flight strips management device reading management information from the airport operation systems, compiling flight strips information representing movement of each aircraft based on the read management information, and storing the compiled flight strips information, wherein the information read from the airport operation systems is collated.

2. A flight strips management system, comprising:

a plurality of airport operation systems, each processing management information concerning an airport's resource allocated to an aircraft; and a flight strips management device reading management information from the airport operation systems, compiling flight strips information representing movement of each aircraft based on the read management information, and storing the compiled flight strips information, wherein said flight strips management device comprises:

a flight strips compilation unit collating the management information read from the airport operation systems and compiling the flight strips information;

a storage unit storing the flight strips information compiled by the flight strips compilation unit; and an information reading unit reading the management information from the airport operation systems and communicating the management information to the flight strips compilation unit.

3. A flight strips management system comprising:

a plurality of information processing devices, each processing management information; and a flight strips management device reading management information from the airport operation system, compiles flight strips information representing movement of each aircraft based on the read management information, and stores the compiled flight strips information, said flight strips management device comprises:

a flight strip compilation unit collating management information read from the information processing devices and compiles this flight strips information;

a storage unit storing flight strips information compiled by this flight strips compilation unit; and an information reading unit reading this management information from the airport information processing device and communicates it to the flight strips compilation unit, wherein said management information includes present, past and future position information and present, past and future condition information, and said flight strips compilation unit collates management information read from the information processing devices and compiles the flight strips information including the present, past and future position information and the present, past and future condition information for each aircraft.

4. The flight strips management system according to claim 3, wherein said flight strips management device further comprises an information display unit that displays, for each aircraft, current position of the aircraft and current condition of the aircraft, on an overall view of the airport, based on the present position information and the present condition information for each aircraft.

5. The flight strips management system according to claim 4, wherein said information display unit displays, for each aircraft, past position and past condition of the aircraft based on the past position information and the past condition information for each aircraft, and future position and future condition of the aircraft based on the future position information and the future condition information for each aircraft, on a view of the airport as a whole.

6. A flight strips management system comprising:

a plurality of information processing devices, each processing management information; and a flight strips management device reading management information from the airport operation system, compiles flight strips information representing movement of each aircraft based on the read management information, and stores the compiled flight strips information, said flight strips management device comprises:

a flight strip compilation unit collating management information read from the information processing devices and compiles this flight strips information;

a storage unit storing flight strips information compiled by this flight strips compilation unit; and an information reading unit reading this management information from the information processing device and communicates it to the flight strips compilation unit, wherein said information reading unit reads the flight strips information from the storage unit and notified each information processing devices of the flight strips information.

7. The flight strips management system according to claim 6, wherein said management information further includes gate and spot allocation information, and wherein said flight strips compilation unit collates, when the gate and spot allocation information is allocated, the gate and spot allocation information in the flight strips information, based on the altered information.

8. A flight strips management system comprising:

a plurality of information processing devices, each processing management information; and a flight strips management device reading management information from the airport operation system, compiles flight strips information representing movement of each aircraft based on the read management information, and stores the compiled flight strips information, said flight strips management device comprises:

a flight strip compilation unit collating management information read from the information processing devices and compiles this flight strips information;

a storage unit storing flight strips information compiled by this flight strips compilation unit; and an information reading unit reading this management information from the information processing device and communicates it to the flight strips compilation unit, wherein said flight strips management device further comprises an information communication unit that is connected through a network with an aircraft to communicate with the aircraft.

9. A method of flight strips management wherein flight strips information representing movement information of each aircraft is compiled on the basis of management information relating to the aircraft and the flight strips information is managed, comprising the steps of:

separately processing by a plurality of information processing devices the management information;

reading from the plurality of information processing devices the management information;

compiling the flight strips information of each aircraft by collating the read management information;

displaying the compiled flight strips information; and communicating the flight strips information to the information processing devices.

10. A method of managing a flight strips management system, comprising:

processing management information concerning an airport's resources allocated to an aircraft from a plurality of airport operation systems; and reading management information from the airport operation systems, compiling flight strips information representing movement of each aircraft based on the read management information, and storing the compiled flight strips information, wherein the information read from the airport operation systems is collated.

11. A method of managing a flight strips management system, comprising:

processing management information concerning an airport's resources allocated to an aircraft from a plurality of airport operation systems; and reading management information from the airport operation systems, and compiling flight strips information representing movement of each aircraft based on the read management information, and storing the compiled flight strips information, wherein the flight strip management system:

collates management information read from the airport operation systems and compiles this flight strips information;

stores flight strips information compiled by the flight strips; and reads this management information from the airport operations systems and communicates it to a flight strips compilation unit, and wherein the flight strips information is read from a storage unit and notifies each airport operation system of the flight strips information.

* * * * *